United States Patent [19]

Brockway

[11] 4,208,859
[45] Jun. 24, 1980

[54] LOCKING DEVICE FOR BLADE OF ROTARY LAWN MOWER

[76] Inventor: Charles E. Brockway, 1908 W. County Rd. E., St. Paul, Minn. 55112

[21] Appl. No.: 953,781

[22] Filed: Oct. 23, 1978

[51] Int. Cl.² .............................................. A01D 75/18
[52] U.S. Cl. ...................................... 56/255; 248/302
[58] Field of Search ............................... 56/255, 17.4; 248/226.5, 302, 72

[56] References Cited

U.S. PATENT DOCUMENTS

| | | | |
|---|---|---|---|
| 2,902,167 | 9/1959 | Smith | 248/302 |
| 3,101,629 | 8/1963 | Koelndorfer | 56/255 |
| 3,173,234 | 3/1965 | Vodinelich | 56/255 |
| 3,220,680 | 11/1965 | Williams | 248/302 |

Primary Examiner—Jay N. Eskovitz
Attorney, Agent, or Firm—Gary L. Griswold

[57] ABSTRACT

A device for locking the blade of a rotary lawn mower from rotation comprising a handle and two side members in planar relation with the handle and oriented normal to the handle, each of the side members having attached thereto a leg extending outwardly from the side member and forming a channel between the leg and the side member for receipt of a rotary mower blade and additionally being spaced from the side member to form a groove between the legs and the side members for receipt of the vertical element of the mower housing; means at the groove between the legs and the side members for causing a friction fit of the device on the mower housing.

5 Claims, 3 Drawing Figures

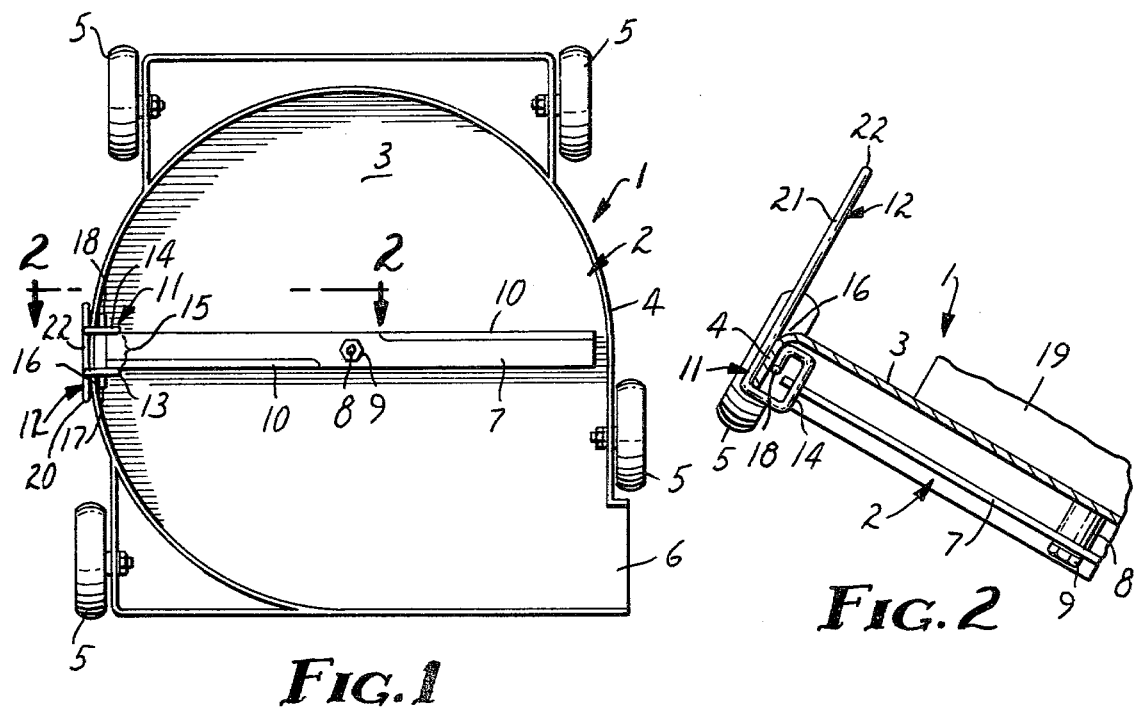
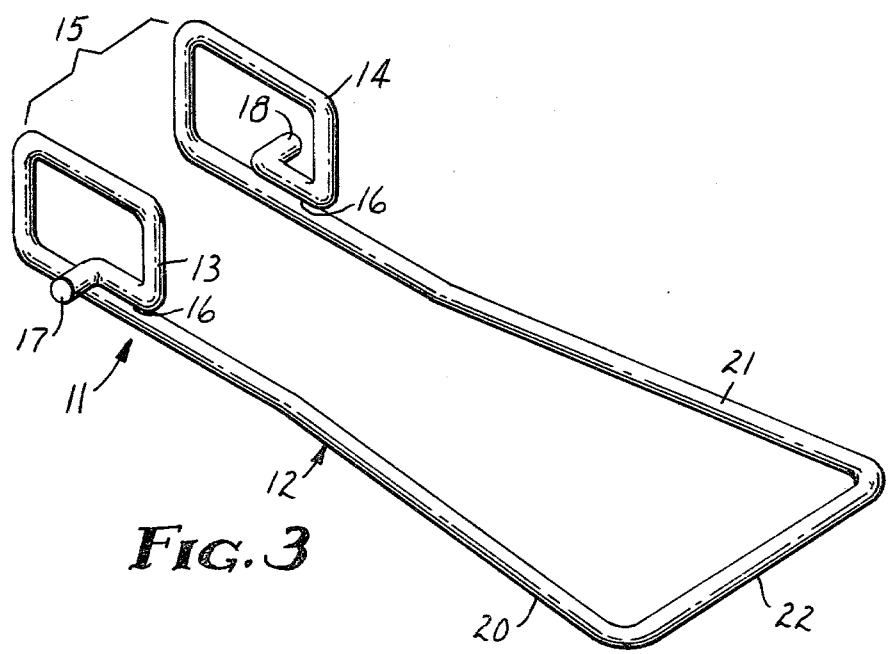

LOCKING DEVICE FOR BLADE OF ROTARY LAWN MOWER

This invention relates to devices for preventing the rotation of a blade of a rotary lawn mower. Particularly, this invention relates to a device which is force-fit onto a rotary lawn mower housing and is useful as a safety device during maintenance of the rotary lawn mower.

As a routine measure in maintaining a rotary lawn mower the blade is removed from the shaft upon which it is mounted and which causes it to rotate. This allows the blade to be sharpened, straightened or replaced. Removal of the blade involves removal of the nut which holds the blade onto the shaft. This often causes the blade to rotate. In some cases, the engine which drives the mower blade will start because of the partial rotation of the blade and shaft. Injuries to the person working on the mower can result from such accidental starting and can also result from mere rotation of the blade.

A device is described in U.S. Pat. No. 3,173,234 which provides a means for locking the blade of a rotary lawn mower in place during maintenance on the blade or removal of the blade. This device includes a screw-driven clamp for holding the device on the housing of the mower. This device is relatively expensive to manufacture and requires two hands to place it in position.

Applicant has discovered a device for preventing the rotation of a rotary lawn mower blade which is inexpensive to manufacture and can be placed in locking position with a single hand. The device comprises a vertically extending base member, a pair of legs extending outwardly from said base member at one end thereof and in spaced relation to each other to provide a channel between said legs for receipt of a rotary mower blade, said legs being connected to said base member at one end of said legs and spaced from said base member at the other end thereof to provided a groove between said legs and said base member for receipt of a portion of the verticaly element of a mower housing, and means for causing a friction-fit of said device on said mower housing located at said groove between said legs and said base member.

The invention will be described in more detail with reference to the following drawings in which FIG. 1 is a bottom view of a conventional lawn mower depicting the device of the present invention secured thereto;

FIG. 2 is a partial sectional view as seen from line 2—2 of FIG. 1; and

FIG. 3 is a perspective view of a device of the present invention.

Referring to the figures in more detail, mower 1 comprises housing 2 comprising horizontal portion 3 and a vertical element 4. Attached to the housing 2 of the mower 1 are wheels 5 which provide mobility for the mower across the surface being cut. The grass to be cut by the mower is discharged from the housing via outlet 6.

The grass is cut by rotary blade 7 which is attached to the power shaft 8 by nut 9. The power shaft is driven by an engine 19. The cutting edge 10 of rotary blade 7 cuts the grass and also can cause the aforementioned injuries to persons working on the mower who are maintaining or removing rotary blade 7. Rotary blade 7 is held in place during such maintenance by device 11 comprising vertically extending base member 12 attached to a pair of legs 13, 14 which form a channel 15 in which the rotary blade 7 is held. The vertical element 4 of housing 2 fits between base member 2 of device 11 and legs 13, 14 in groove 16 formed between the aforesaid. The device 11 is held firmly in place by the friction-fit of vertical element 4 of housing 2 between the projections 17, 18 attached to legs 13, 14 respectively, and base member 12.

FIG. 3 depicting the perspective view of the device 11 of the present invention shows that base member 12 of device 11 comprises two side members 20, 21 attached to handle portion 22 which are in planar relation to handle portion 22 and relatively normal thereto. As can be seen from FIG. 3, the device comprises an integrally formed device. The device can be made of any metallic material such as steel and/or suitably strong polymeric material and can be made by conventional techniques such as plastic molding or metal forming procedures.

In FIG. 3, handle portion 22 is connected by side members 21, 22 to legs 13, 14. Legs 13, 14 form the channel 15 in which the mower blade 7 is placed. The legs 13, 14 are shaped in the form of an incomplete rectangle and are integrally made and attached to side members 20 and 21, respectively. Attached to legs 13, 14 are projections 17 and 18, respectively which cause the device to be friction-fit in position on the vertical element 4 of housing 2 of mower 1 when element 4 is placed in groove 16 between side members 20 and 21 of base member 12 and legs 13, 14 of the device. The friction-fit alternatively can be obtained at groove 16 by the elements such as projections located on base member 12.

When it is desired to fix device 11 to mower 1 to prevent rotation of blade 7, device 11 is placed adjacent to vertical element 4 of housing 2 and blade 7 is located between legs 13, 14 of the device 11 in channel 15. Force is applied to handle 22 to pull device 11 vertically whereby groove 16 of device 11 is forced over vertical element 4 of housing 2 and device 11 is friction-fit in place by projections 17, 18 of device 11 pressing vertical element 4 of housing 2 against vertical base member 12 of device 11.

Device 11 can be placed in position using one hand. The device in position on mower 1 is shown most clearly in FIG. 2. Blade 7 can then be removed by removal of nut 9 from power shaft 8. The device 11 is removed from vertical element 4 of housing 2 by application of downward pressure on handle 22 of device 11. When in place, device 11 prevents rotation of blade 7 because of the friction-fit above-described of the device 11 on vertical element 4 of housing 2 and because blade 7 is locked into position between legs 13, 14 of device 11 in channel 15.

Various modifications of the present invention specifically described herein will become apparent to those skilled in the art. These are deemed to be within the claims which are set forth below.

What is claimed is:

1. In a rotary lawnmower comprising a mower housing, a device for preventing rotation of a rotary mower blade comprising
    (a) a vertically extending base member,
    (b) a pair of legs extending outwardly from said base member at one end thereof in spaced relation to each other to provide a channel between said legs for receipt of a rotary mower blade, said legs being connected to said base member at one end of said legs and spaced from said base member at the other end thereof to provide a groove between said legs and said base member for receipt of a portion of the vertical element of said mower housing, and (c) means for causing a friction-fit of said device on said mower housing located at said groove between said legs and said base member.

2. The device of claim 1 wherein said vertically extending base member comprises a handle and two side members in planar relationship to said handle and oriented relatively normal to said handle.

3. The device of claim 2 wherein each of said legs is attached to the respective side member of said vertically extending base member.

4. The device of claim 3 wherein said means for causing a friction-fit of said device on said mower housing comprises at least one projection extending from at least one of said legs and across at least a protion of said groove to cause said housing to be held between said projection and said vertically extending base member.

5. In a rotary lawn mower comprising a rotary blade, a housing for the blade surrounding the blade on the top and sides thereof and containing vertical and horizontal elements, means for rotating the blade attached to the top of the housing and means for attaching the blade to the means for rotating the blade, the improvement comprising a device for preventing rotation of the blade within the housing comprising (1) a vertically extending base member, (2) a pair of legs extending outwardly from said base member at one end thereof in spaced relation to each other to provide a channel between said legs removably containing a portion of said blade, said legs being connected to said base member at one end of said legs and spaced from said base member at the other end thereof to provide a groove between said legs and said base member, said groove removably containing a portion of the vertical element of the mower housing, and (3) means for causing a friction-fit of said device on said mower housing located at said groove between said legs and said base member, said means for causing a friction-fit releasably holding said vertical element of the mower housing in said groove.

* * * * *